United States Patent [19]

Tsunoda

[11] Patent Number: 5,635,625
[45] Date of Patent: Jun. 3, 1997

[54] OIL CHANGER

[75] Inventor: Tetsuya Tsunoda, Tokyo, Japan

[73] Assignee: Yamada Corporation, Tokyo, Japan

[21] Appl. No.: 498,227

[22] Filed: Jul. 5, 1995

[30] Foreign Application Priority Data

Jul. 6, 1994 [JP] Japan ................... 6-154695

[51] Int. Cl.$^6$ ............... G01N 33/26; F01M 1/00
[52] U.S. Cl. ............... 73/19.11; 123/196 R; 123/196 S
[58] Field of Search ............... 73/19.11, 861.04; 123/196 R, 196 S

[56] References Cited

U.S. PATENT DOCUMENTS

| | | | |
|---|---|---|---|
| 4,421,078 | 12/1983 | Hurner | 123/196 R |
| 4,508,195 | 4/1985 | Millet | 123/196 R |
| 4,674,456 | 6/1987 | Merritt | 123/196 R |
| 5,209,198 | 5/1993 | Bedi | 123/196 R |
| 5,372,219 | 12/1994 | Peralta | 123/196 S |
| 5,487,447 | 1/1996 | Martinez Velazquez | 123/196 R |

FOREIGN PATENT DOCUMENTS

| | | |
|---|---|---|
| 3402093 | 8/1985 | Germany . |
| 4028734 | 3/1992 | Germany . |
| 1580824 | 12/1980 | United Kingdom . |

*Primary Examiner*—Richard Chilcot
*Assistant Examiner*—Max H. Noori
*Attorney, Agent, or Firm*—Wenderoth, Lind & Ponack

[57] ABSTRACT

An oil changer comprises at least piping 5, 9, 10, along which an oil pump 12 and switching valves 8a, 8b are disposed, and first and second oil reservoirs 3, and 4. Used oil in an oil use location is recovered into the oil reservoir 4 via the piping, while unused oil in the first oil reservoir 3 is supplied into the oil use location via the piping. In this case, a flowmeter 11 for measuring an oil flow rate, as well as air sensors 6a, 6b for detecting the existence of air in used and/or unused oil when the air happens to exist in a flow of the used or unused oil and for outputting a predetermined signal, are provided at intermediate positions along the length of the piping 5, 9, and 10. Furthermore, a control section is provided into which the flow rate signal from the flowmeter 11 is inputted and which normally counts the number of the flow rate signals, but does not count them when the predetermined signal is inputted. Thus, as measurement error which would otherwise occur when air happens to be mixed into oil can be avoided, it is possible to measure, by means of the flowmeter and with high accuracy, the oil flow rate of the oil to be exchanged.

8 Claims, 4 Drawing Sheets

ововNumber: 5,635,625

OIL CHANGER

BACKGROUND OF THE INVENTION

The present invention relates to an oil changer for improving the measurement accuracy of the flow rate of oil which is changed or exchanged between an engine and an oil reservoir or between a torque converter and the oil reservoir, by measuring the flow rate directly, and for avoiding measurement errors which would occur when air happens to be mixed into the oil to be measured.

Prior Art (i) One type of conventional oil changer utilizes an oil weight measurement system. In an oil changer of this type, the weight of used oil (hereinafter, referred to as waste oil) in an engine of an automobile is measured when the waste oil is bled therefrom into an oil reservoir for receiving waste oil (hereinafter, referred to as a waste oil reservoir), and unused oil (hereinafter, referred to as new oil), the weight of which corresponds to the waste oil that was bled, is supplied into the engine from another oil reservoir containing new oil (hereinafter, referred to as a new oil reservoir) for changing of the oil. In this case, actually, the amount of the weight of the oil is converted into an electrical signal through a weight meter and a load cell, and the electrical signal SO– converted is then amplified by an amplifier. The electrical signal SO– amplified is then introduced into programmed software of a control section so as to control the operation of a switching valve and an oil pump.

(ii) Another type of the conventional oil changer utilizes an oil level detection system. In an oil changer of this type, waste oil in an engine of an automobile is bled into a waste oil reservoir having an oil level detector, and the oil level of the bled waste oil is detected by the oil level detector. Then, new oil, an amount of which corresponds to the detected waste oil level, is supplied into the engine from a new oil reservoir having another oil level detector for changing of the oil. In this case, actually, the amount of the oil level is converted into an electrical signal through a float and a strain meter, and the electrical signal so converted is amplified by an amplifier. The electrical signal so amplified is then introduced into programmed software of a control section so as to control the above-mentioned operation.

In the above-described two conventional examples, however, there are following drawbacks:

1) According to the oil weight measurement system using the weight meter, it is impossible to directly obtain the weight of oil itself, and the weight of oil is obtained indirectly by subtracting the weight of the reservoir from the total weight of the reservoir and the oil therein. Therefore, the weight of the oil so obtained is easily affected by fluctuations of the weight of the oil reservoir which may occur when the oil reservoir is exchanged or if dust and/or mud adheres to the oil reservoir, thereby resulting in a measurement error of the weight of oil.

In addition, according to the oil level detection system using the float, oil can be measured only in a state in which it is stored in the oil reservoir, and therefore, if an oil reservoir is exchanged or if the oil reservoir is deformed due to an impact unexpectedly given thereto at a service station, the oil level is caused to fluctuate, thereby resulting in measurement error of the weight of oil.

Furthermore, as a general method for directly obtaining the volume of oil, there is the possibility of using a flowmeter. In this method, however, when air happens to be mixed into the oil, the volume of the air is also erroneousely measured as part of the oil. Therefore, up to now, there has actually been no oil changer which uses a flowmeter.

2) Moreover, in particular, according to the oil level detection system, as in the above case, if air is mixed into oil and stays therein in the form of bubbles, the oil level is caused to rise by the bubbles, thereby resulting in measurement error.

3) In addition, according to both of the oil weight measurement and oil level detection systems, apart from the operating parts such as the weight meter or the float, the systems require a load cell or the strain meter as well as elaborate electric devices such as an amplifier, whereby the construction of the device is made complicated and expensive.

4) Furthermore, in view of the fact that the oil changer is used at a working site such as a service station or a garage, where there is much dust and vibration, there is always a risk that the above electric devices are easily caused to go wrong by the dust and vibration.

SUMMARY OF THE INVENTION

The present invention provides an oil changer having piping along which an oil pump and a switching valve are disposed, and first and second oil reservoirs. Used oil in an oil use location is recovered into the second oil reservoir through the piping, while unused oil in the first oil reservoir is supplied onto the oil use location through the piping. The oil changer is characterized in that an oil flowmeter measuring the flow rate of oil, and an air sensor for detecting the existence of air in the used and/or unused oil when air happens to exist in the flow of the use or unused oil and for outputting a predetermined signal, are provided at intermediate positions along the length of the piping. A control section is further provided which is designed to normally count the number of flow rate signals which are input from the flowmeter, but does not count them when the predetermined signal from the air sensor is input.

Consequently, according to a construction of the present invention, the following advantageous effects can be obtained:

1) Since the volume of oil itself is directly obtained through a flowmeter and an air sensor, it is unlikely that the measurement of the volume of oil will be affected by fluctuations in the weight of the oil reservoirs or by the deformation of the same, whereby the measurement accuracy can be improved;

2) In particular, as compared with the conventional oil level detection system in which measurement error is liable to occur when air happens to be mixed into the oil, an oil measuring operation is stopped when air mixed into the oil is detected by an air sensor thereby avoiding any measurement error in advance. Therefore, the flowmeter can function accurately, thus making it possible to improve the measurement accuracy on the whole;

3) Compared with the conventional oil weight measurement system and oil level detection system, since no elaborate electrical devices are required other than the flowmeter and air sensors which also function as operating components, it is possible to make the construction of the device simpler as well as to reduce costs; and 4) As mentioned above, since there is required no elaborate electrical devices are required, the whole device according to the present invention is not affected by dust and/or vibration occurring at the work site, thereby making it possible to improve the durability and reliability thereof.

PREFERRED EMBODIMENT OF THE INVENTION

Figure 1:
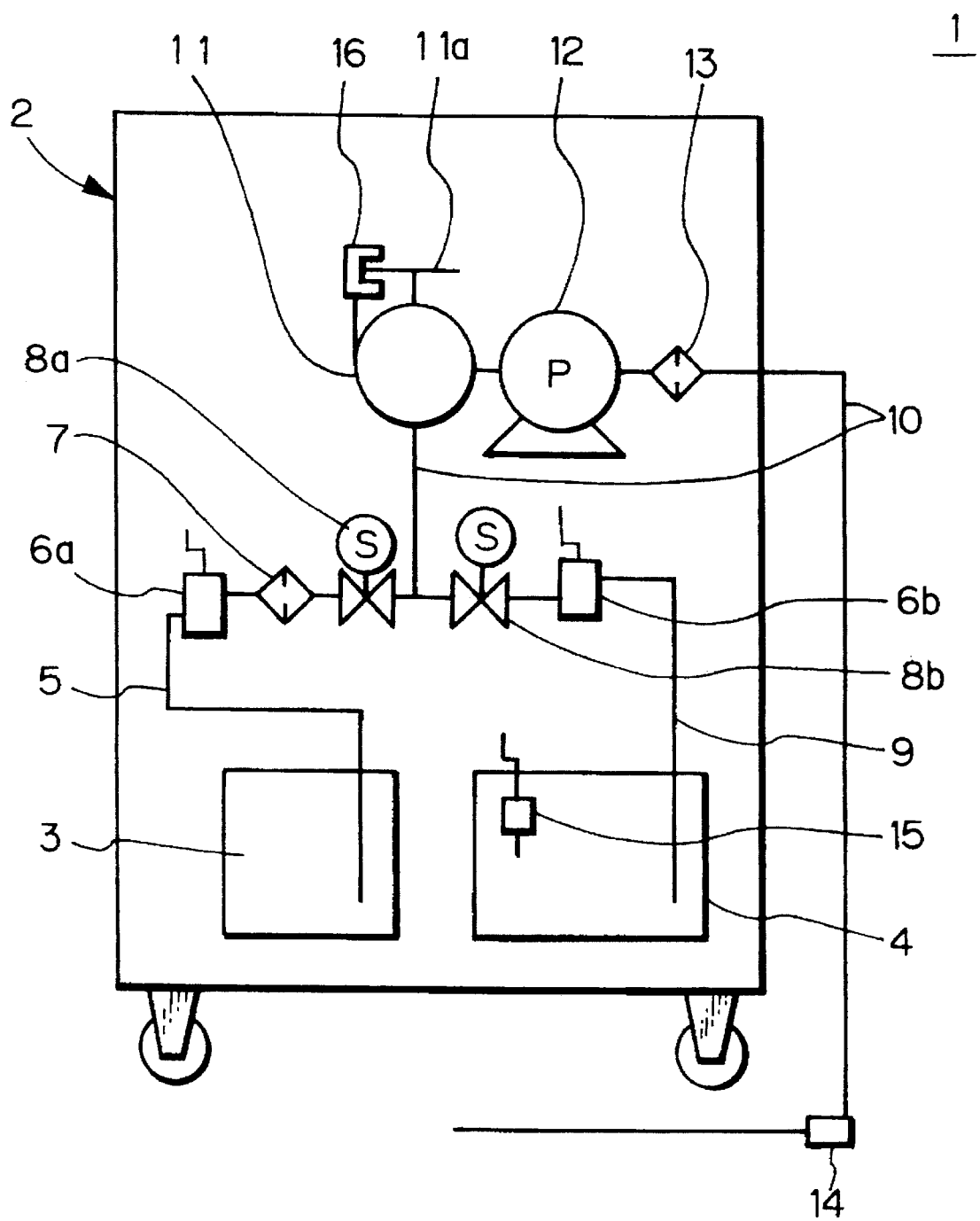
FIG. 1 is a diagram showing a schematic overall construction of an embodiment of an oil changer according to the present invention.

In FIG. 1, reference numeral 1 denotes an oil changer according to the present invention, which has a new oil can (new oil reservoir) 3 and a waste oil can (waste oil reservoir) 4 provided in a main body 2 of the oil changer. The new oil can 3 is connected to an air sensor 6a for new oil, a filter 7 and an electromagnetic valve 8a for new oil in a sequential manner via a hose 5. The waste oil can 4 is connected to an air sensor 6b for waste oil and an oil electromagnetic valve 8b for waste oil in a sequential manner via hose 9. In addition, to a common hose 10 where the two hoses 5, 9 are joined together, a flowmeter 11, a reversibly rotatable oil pump 12, a filter 13 and a nozzle 14 are connected. Furthermore, reference numeral 15 denotes a sensor for detecting the overflow of waste oil from the waste oil can 4. Moreover, the flowmeter 11 has a rotary type pulse measuring disc 11a, which rotates across a photomicro switch 16 and outputs electric pulse signals representing a measured flow rate. A control section (not shown) counts the number of these pulse signals and obtains a flow rate.

The new oil can 3 may be, for instance, a pail type oil can of 20 or 18 liters as are on the market, or any other type of oil can of 5, 4 or 1 liters or of any other capacity. Those cans can be made of steel or resin. In short, any type of can may be used, as long as the oil hose S for new oil can be inserted therein.

Figure 2:
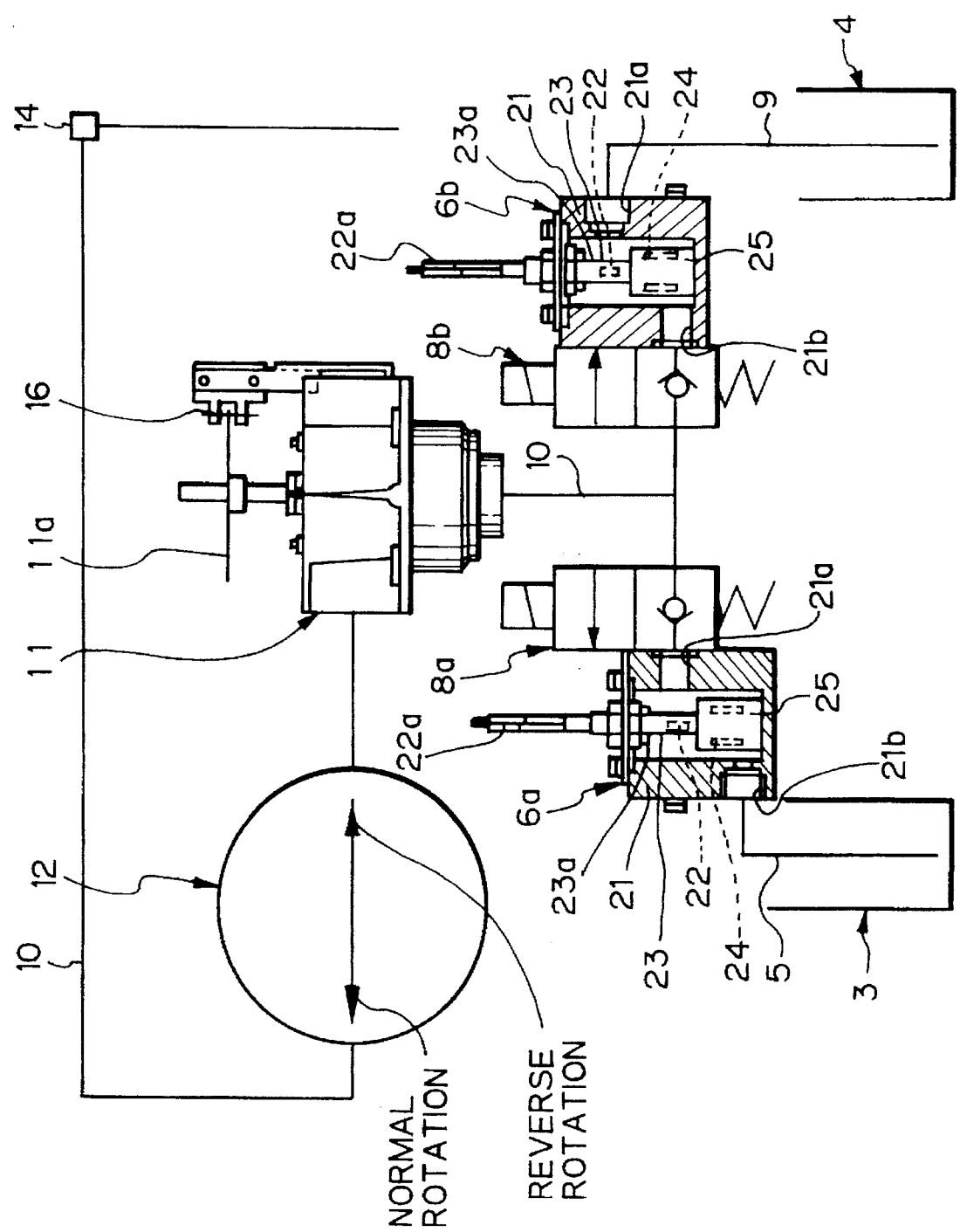
FIG. 2 is a diagram showing a schematic overall construction of the above oil changer in which some parts are enlarged while others are omitted.

As shown in FIGS. 2 (in which the filters 7 and 13 are omitted) and 5 (in which an external casing 21 is omitted), the air sensor 6 (6a, 6b) is a so-called float-type level switch which is sold on the market. This air sensor 6 comprises an external cylindrical casing 21 having an upper port 21a and a lower port 21b, an internal casing 23 having upper and lower stoppers 23a, 23b and concentrically and internally fixed to the external casing 21 and containing a reed switch 22 (which has a lead wire 22a), and a cylindrical float 25 concentrically and loosely fitted around the internal casing 23 so as to move in a vertical direction and incorporating therein a magnet 24.

In addition, while the air sensors 6a and 6b are identical to each other, as shown in FIG. 2, the air sensor 6a on the hose 5 for new oil is connected to the electromagnetic valve 8a at its upper port 21a and to the new oil can 3 at its lower port 21b. On the contrary, the air sensor 6b on the hose 9 for waste oil is connected to the other electromagnetic valve 8b at its lower port 21b and to the waste oil can 4 at its upper port 21a.

In each of the air sensors 6a and 6b, when there is no oil flow, the float 25 is in abutment with the lower stopper 23b of the internal casing 23 due to its own weight. Since at this time the magnet 24 is located at a position where it does not confront the reed switch 22, the reed switch 22 remains in an off-condition, that is, a pair of reeds of the reed switch 22 remain detached from each other.

Next, an operation of the above oil changer will be described when it is applied to change or exchange engine oil. First, the device is switched into a mode of exchanging engine oil by operating a button on a control panel (not shown)

Figure 3:
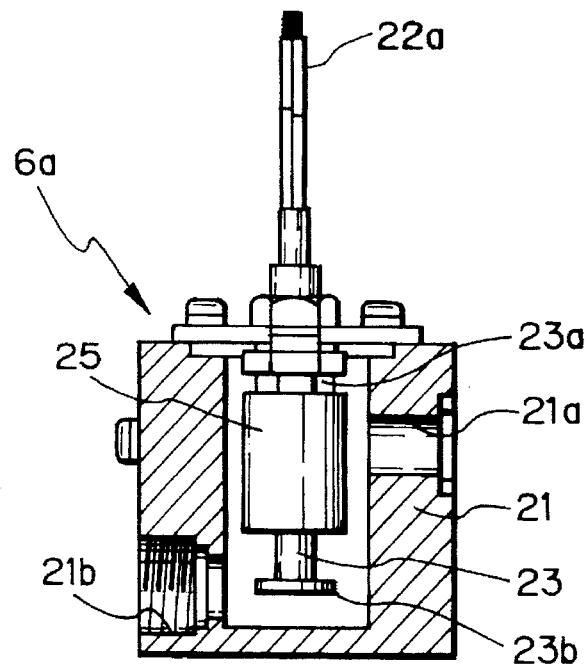
FIG. 3 is a diagram showing a state in which one of two air sensors shown in FIG. 2 has completed its operation.

Then, as shown in FIGS. 1 and 2, the nozzle 14 is inserted into the engine and only the electromagnetic valve 8b on the waste oil side is lowered to be switched to an open state from a closed state thereof. Next, the oil pump 12 is driven to rotate in a reverse direction by a signal from the control section. Then, waste oil in the engine is caused to flow into the waste oil can 4 through the nozzle 14, common hose 10, flowmeter 11 and oil hose 9 in a sequential manner. At this moment, waste oil flows into the air sensor 6b from the lower port 21b thereof and flows out from the upper port 21a thereof. Therefore, as shown in FIG. 3, the float 25 is forcibly moved upward, by virtue of the flow resistance and viscosity of oil, to its upper limit position where it comes into abutment with the upper stopper 23a, and is maintained at the upper limit position. Due to this, the magnet 24 is displaced to a position confronting the reed switch 22, the reed switch 22 being thereby switched into an on-condition, that is, the pair of reeds thereof come into contact with each other.

Consequently, in response to ON signal (in other words, a permission signal for permitting the measurement operation of a flow rate) from the reed switch 22, the control section starts to properly count flow rate pulse signals from the flowmeter 11.

Thus, the whole amount of waste oil in the engine is bled out into the waste oil can 4. Since the nozzle 14 tends to suction air when completing the bleeding of the oil, masses of air pass through the air sensor 6b. Then, the resistance and viscosity of oil is reduced due to the existence of the suctioned air, the weight of the float 25 overcomes the resistance and viscosity of oil, and the float 25 is then lowered down to the lower position shown in FIG. 2. This also causes the magnet 24 to move away from the reed switch 22 and to return to the original position, the reed switch 22 being thus switched to off-condition. In response to an OFF signal from the reed switch 22, the control section stops counting pulse signals from the flowmeter 11. In other words, the measurement operation of the flow rate is stopped.

When this condition in which the measurement operation is stopped continues for three seconds, for instance, the control section evaluates that the whole amount of the engine oil has been completely bled. Therefore, the control section outputs a signal for stopping the oil pump 12 and, in synchronism with this, based on the whole of the above pulse signals, the control section stores the value of the whole amount of waste oil that has passed through the flowmeter 11.

Further, the electromagnetic valve 8b on the waste oil side is moved upward by a signal from the control section to be switched so as to return to the closed state.

Next, an operation of supplying new oil will be described.

Figure 4:
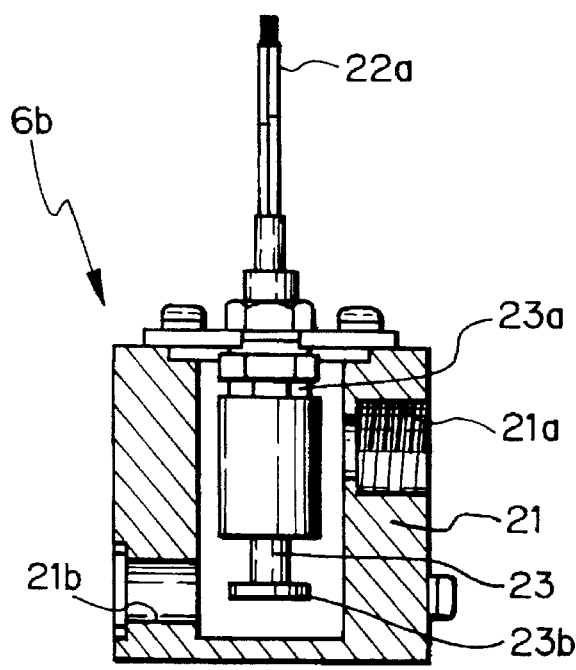
FIG. 4 is a diagram showing a state in which the other of the air sensors has completed its operation.
Figure 5:
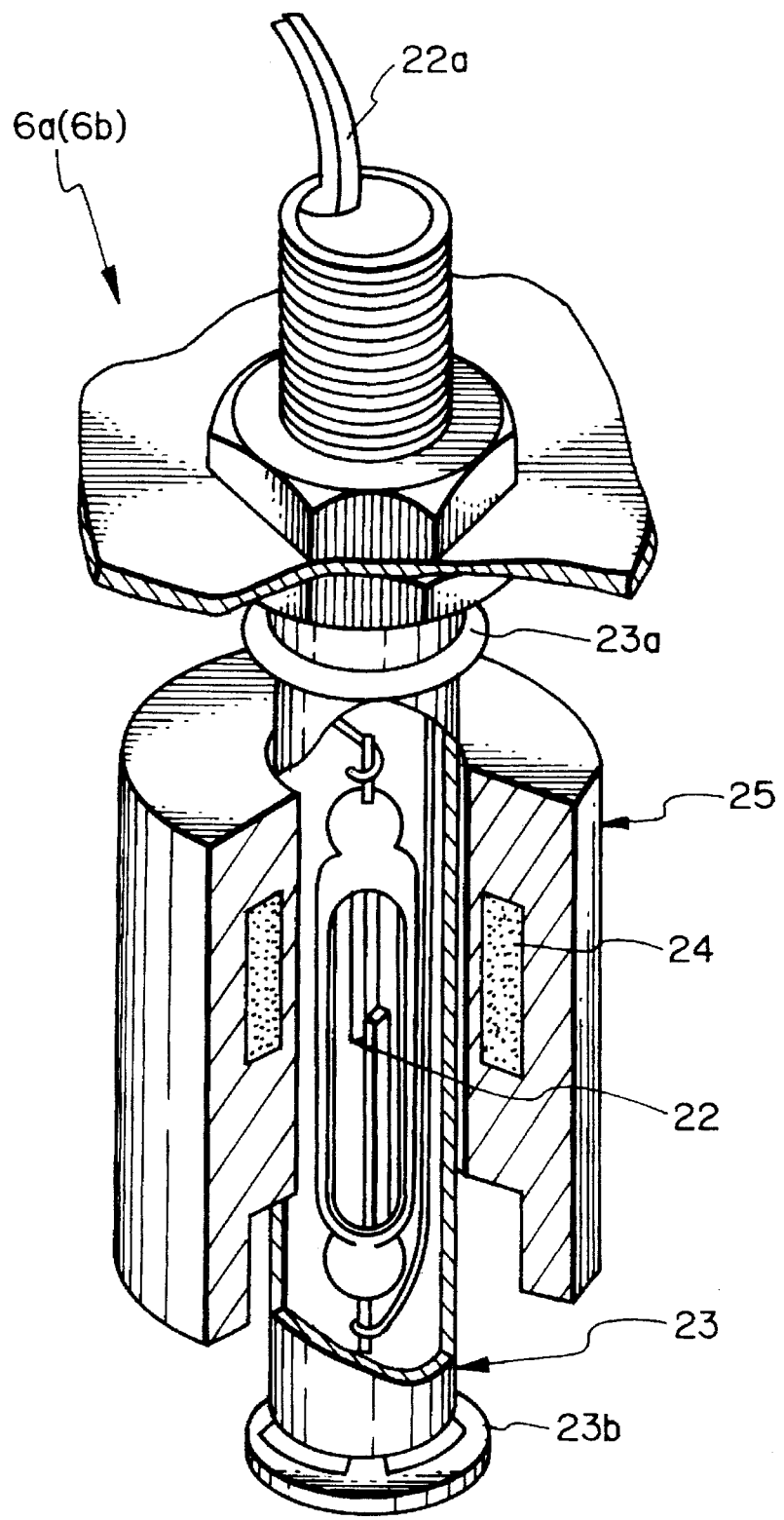
FIG. 5 is a perspective view, partially cut away, of one of the air sensors with its external cylindrical casing (21) is omitted.

The electromagnetic valve 8a on the new oil side is lowered and switched to an open state thereof. Following this, the oil pump 12 is driven to rotate normally at this time. Consequently, new oil in the oil can 3 starts to be supplied into the engine from the nozzle 14 via the hose 5 for new oil, air sensor 6a, electromagnetic valve 8a, common hose 10 and flowmeter 11 in a sequential manner. At this moment, new oil, as in the above case where waste oil is bled from the engine, flows into the air sensor 6a from the lower port 21b thereof and flows out from the upper port 21a thereof. Due to this, as shown in FIG. 4, the float 25 is moved upward to the upper limit position thereof and is maintained thereat, the reed switch 22 being thereby switched to on-condition.

Therefore, as in the above case where waste oil is bled from the engine, the control section properly counts flow rate pulse signals from the flowmeter 11. When an amount of the supplied new oil becomes equal to the stored measurement value of the waste oil bled, the oil pump 12 is stopped whereby the supply of new oil is completed. Afterwards, the air sensor 6a and the electromagnetic valve 8a are returned to the positions shown in FIG. 2, respectively.

Next, a case where air happens to be mixed into oil while waste oil is being bled or new oil is being supplied will be described. In other words, since engine oil is stirred by a crank or the like while an automobile is running, masses of air are liable to be mixed into oil. In the present invention, however, the flowmeter 11 and the air sensors 6a and 6b are elaborately combined with each other. Therefore, in the present invention, the function of the flowmeter 11 is not affected by masses of air mixed into oil, and thus the flowmeter 11 can perform a sufficient function in measuring accurately the volume of oil.

Namely, when masses of air pass through the air sensor 6b while waste oil is being bled, as described above the float 25 is lowered and the reed switch 22 is switched to the off-condition and outputs an OFF signal. In response to this OFF signal, the control section stops counting the flow rate pulse signals, whereby the measurement operation of a flow rate is stopped. This condition is maintained as long as masses of air continue to flow through the air sensor 6b. However, when oil starts to normally flow again, the float 25 is moved upward again. Therefore, the output of the OFF signal is stopped, whereby the measurement operation of the normal flow rate starts again.

Similarly, in a case where new oil is supplied, the measurement operation of the flow rate is not performed as long as masses of air mixed into new oil continue to flow through the air sensor 6a. The reason why air is mixed into new oil is that, for instance, external vibrations are applied to the a new oil can 3 after it is opened. Another reason is that, in a case where a pail-type can sold on the market is used as a new oil can, which has a predetermined volume, new oil in the can may happen to run out while new oil is being supplied to the engine, thereby causing air to be mixed into the new oil.

As is described above, measurement error of an oil flow rate is avoided in advance, which error may be caused when air is mixed into oil while waste oil is being bled or new oil is being supplied, whereby the measurement accuracy can be improved.

Next is another case where the oil changer of the present invention is applied to an operation of exchanging oil in a torque converter and a piping connected thereto. Although in the case of exchanging engine oil, the whole amount of waste oil in the engine is first bled and thereafter an amount of new oil equal to that of the waste oil bled is supplied into the engine at one time, the operation of exchanging torque converter oil is carried out separately at a plurality of times.

First of all, the device is switched to a mode of exchanging torque converter oil by operating a button on the control panel (not shown). Then, the whole amount (for instance, 4 liters, 6 liters or 8 liters) of oil to be exchanged is set on the control panel. The nozzle 14 is then inserted into the torque converter and the electromagnetic valve 8a for new oil is switched to an open state. The oil pump 12 is then driven to rotate normally, whereby new oil is supplied into the torque converter from the new oil can 3 through the hoses 5 and 10. An amount of new oil supplied for a first period of time is a fraction of the whole amount of new oil to be exchanged (for instance, when the whole amount of oil to be exchanged is 4 liters, the fraction is 800 cc).

Next, the electromagnetic valve 8a is switched to return to a closed state, and the electromagnetic valve 8b for waste oil is instead switched to an open state, and the oil pump 12 is driven again to rotate normally. Then, waste oil is supplied from the waste oil can 4 into the hoses 9 and 10, for instance, by 100 cc. Therefore, 100 cc of new oil remaining in the common hose 10 is further supplied into the torque converter as it is pressed by the 100 cc of the supplied waste oil. The purpose of this process is to eliminate an economically disadvantageous possibility that 100 cc of new oil remaining in the common hose 10 is inconveniently sent back to the waste oil can 4.

Then, the oil pump 12 is driven to rotate reversely, and waste oil in the torque converter is bled by 900 cc and sent back to the waste oil can 4. The amount of waste oil that is actually bled from the torque converter at this time is 800 cc which is obtained by subtracting 100 cc of the supplied waste oil remaining in the common hose 10 from 900 cc, and this 800 cc of the waste oil actually bled is equal to the amount of new oil initially supplied.

Next, the above electromagnetic valve 8b is switched to return to the open state, and the electromagnetic valve 8a is closed again. Then, the above series of the operations of supply of new oil by 800 cc, supply of waste oil by 100 cc and bleeding of waste oil by 900 cc are carried out for the second time, and these series of operations are repeated five times in total, whereby the supply of 4 liters of new oil is completed.

In addition, the reason why oil in the torque converter is exchanged at a plurality of times is as follows. Oil in the torque converter is widely distributed not only in the torque converter itself, but also in the oil pipings (such as a gear box and an oil cooler and the like) connected thereto. Therefore, in order to uniformly exchange oil existing throughout these oil pipings, oil has to be exchanged while being circulated during the running condition of the engine, and this fact is well known in the art.

According to this operation of exchanging oil in the torque converter, as in the case of the operation of exchanging of oil in the engine, the measurement of a flow rate can be performed accurately by the flowmeter 11. In addition, in a case where air happens to be mixed into new or waste oil, an operation of measuring a flow rate is stopped by the air sensors 6a and 6b, and thereby measurement error is avoided.

In the above embodiment, while the new oil hose 5 and waste oil hose 9 are joined into the single common hose 10 at intermediate positions along the length thereof, it is needless to say that the new oil hose 5 and waste oil hose 9 may be separated along the whole length thereof, respectively.

Moreover, in the above embodiment, while the counting of flow rate signals is performed in response to an ON signal from the reed switch 22 of the air sensors 6a and 6b, on the contrary, it is needless to say that counting may be performed in response to an OFF signal.

Furthermore, it is also needless to say that, instead of the magnet 24 of the float 25 and the reed switch 22, a switch in another form may be provided which is adapted to be switched in response to the movement of the float 25.

In addition, the type of air sensors 6a and 6b is not limited to a float type level switch. In short, they may be of any type as long as they can output a signal when reacting to air mixed into oil.

What is claimed is:

1. An oil changer, comprising:

first and second oil reservoirs for containing unused and used oil, respectively;

piping extending from said first and second oil reservoirs to an oil use location such that used oil can be drained from said oil use location to said second reservoir and unused oil can be delivered to the oil use location from said first reservoir;

an oil pump disposed along said piping for pumping oil from the oil use location to said second oil reservoir through said piping and from said first oil reservoir to the oil use location through said piping, and at least one switching valve disposed along said piping;

a flow rate meter disposed along said piping for measuring the flow rate of oil through said piping and outputting a flow rate signal; and at least one air sensor disposed along said piping for detecting the presence of air in the used or unused oil flowing through said piping, said at least one air sensor comprising a switch switchable between an open state and a closed state, and outputting a predetermined signal when said switch is in one of said open state and said closed state, and a float movable between a first position in which said float causes said switch to be in said open state and a second position in which said float causes said switch to be in said closed state, said float having the properties of being floated by oil and not being floated by air, and said predetermined signal corresponding to said float not being floated and the presence of air in the oil; and a control section for receiving said predetermined signal from said at least one air sensor and said flow rate signal from said flow rate meter, counting a number of flow rate signals from said flow rate meter when said predetermined signal is not output from said at least one air sensor and is not received by said control section, and not counting the number of flow rate signals when said predetermined signal is output from said at least one air sensor and received by said control section.

2. The oil changer of claim 1, wherein said piping comprises a first piping section connected with said first oil reservoir, a second piping section connected with said second oil reservoir, and a common piping section, wherein said first and second piping sections extend separately from said respective first and second oil reservoirs to said common piping section, wherein said at least one air sensor comprises two air sensors, with one of said air sensors being in said first piping section and the other of said air sensors being in said second piping section, and wherein said oil pump and said flow rate meter are in said common piping section.

3. The oil changer of claim 1, wherein said piping between said first oil reservoir and the oil use location and said piping between said second oil reservoir and the oil use location extends separately throughout the entire length thereof.

4. The oil changer of claim 1, wherein said float comprises a magnet and said switch comprises a reed switch, whereby said reed switch is switched between said open state and said closed state by movement of said magnet of said float.

5. The oil changer of claim 2, wherein said at least one switching valve comprises two switching valves, one of said two switching valve being disposed in said first piping section and the other of said two switching valves being disposed in said second piping section.

6. An oil changer, comprising:

first and second oil reservoirs;

piping extending from said first and second oil reservoirs;

an oil pump and a switching valve disposed along said piping;

a flow rate meter disposed along said piping outputting a flow rate signal; and at least one air sensor disposed along said piping, said at least one air sensor comprising a switch switchable between an open state and a closed state, said at least one air sensor outputting a predetermined signal when said switch is in one of said open state and said closed state, and a float movable between a first position in which said float causes said switch to be in said open state and a second position in which said float causes said switch to be in said closed state, said float having the properties of being floated by oil and not being floated by air; and a control section receiving said predetermined signal from said air sensor and said flow rate signal from said flow rate meter.

7. The oil changer of claim 6, wherein said piping comprises a first piping section connected with said first oil reservoir, a second piping section connected with said second oil reservoir, and a common piping section, wherein said first and second piping sections extend separately from said respective first and second oil reservoirs to said common piping section, wherein said at least one air sensor comprises two air sensors, with one of said air sensors being in said first piping section and the other of said air sensors being in said second piping section, and wherein said oil pump and said flow rate meter are in said common piping section.

8. The oil changer of claim 6, wherein said float comprises a magnet and said switch comprises a reed switch, whereby said reed switch is switched between said open state and said closed state by movement of said magnet of said float.

* * * * *